United States Patent
Laine et al.

(10) Patent No.: US 10,377,390 B2
(45) Date of Patent: Aug. 13, 2019

(54) AUTOMATED DRIVING SYSTEM FOR A MOTOR VEHICLE PROVIDED WITH AN ADVANCED VISUAL COMMUNICATION INTERFACE

(71) Applicant: PSA AUTOMOBILES S.A., Poissy (FR)

(72) Inventors: Vincent Laine, Les Clayes Sous Bois (FR); Stephane Feron, Le Plessis Robinson (FR); Celine Taccori Duvergey, Montrouge (FR)

(73) Assignee: PSA AUTOMOBILES SA, Poissy (FR)

( * ) Notice: Subject to any disclaimer, the term of this patent is extended or adjusted under 35 U.S.C. 154(b) by 0 days.

(21) Appl. No.: 16/096,622

(22) PCT Filed: Apr. 24, 2017

(86) PCT No.: PCT/FR2017/050973
§ 371 (c)(1),
(2) Date: Oct. 25, 2018

(87) PCT Pub. No.: WO2017/187077
PCT Pub. Date: Nov. 2, 2017

(65) Prior Publication Data
US 2019/0135305 A1 May 9, 2019

(30) Foreign Application Priority Data
Apr. 25, 2016 (FR) ...................................... 16 53627

(51) Int. Cl.
*B60W 50/14* (2012.01)
*B60K 35/00* (2006.01)
(Continued)

(52) U.S. Cl.
CPC ............. *B60W 50/14* (2013.01); *B60K 35/00* (2013.01); *B60W 50/04* (2013.01);
(Continued)

(58) Field of Classification Search
CPC .................................. B60J 1/20; B60K 35/00
(Continued)

(56) References Cited

U.S. PATENT DOCUMENTS 9,134,729 B1 9/2015 Szybalski et al.
2004/0239141 A1* 12/2004 Iwao .......................... B60J 1/20
296/84.1
(Continued)

FOREIGN PATENT DOCUMENTS

DE 102006060554 A1 6/2008
DE 102014216105 A1 2/2016

OTHER PUBLICATIONS

International Search Report for Corresponding PCT/FR2017/050973 dated Aug. 30, 2017.
(Continued)

*Primary Examiner* — Fabricio R Murillo Garcia
(74) *Attorney, Agent, or Firm* — Sandberg Phoenix & von Gontard PC

(57) ABSTRACT

The invention relates to an automated driving system for a motor vehicle including a visual communication interface intended for informing the driver about the state of said driving system and comprising a luminous indicator capable of emitting luminous signals on the steering wheel of said vehicle; characterized in that said visual communication interface also includes a heads-up display capable of displaying other luminous signals in the field of view of the driver beyond the dashboard of said vehicle.

9 Claims, 1 Drawing Sheet

(51) Int. Cl.
*B60W 50/04* (2006.01)
*B60W 50/00* (2006.01)

(52) U.S. Cl.
CPC ............... *B60K 2350/2008* (2013.01); *B60K 2350/2052* (2013.01); *B60K 2350/928* (2013.01); *B60K 2370/141* (2019.05); *B60K 2370/188* (2019.05); *B60K 2370/21* (2019.05); *B60K 2370/334* (2019.05); *B60K 2370/782* (2019.05); *B60W 2050/0096* (2013.01); *B60W 2050/146* (2013.01)

(58) Field of Classification Search
USPC ...................................................... 340/425.5
See application file for complete search history.

(56) References Cited

U.S. PATENT DOCUMENTS

| | | | |
|---|---|---|---|
| 2005/0280275 A1* | 12/2005 | Uenuma | B60J 1/00 296/84.1 |
| 2013/0096767 A1 | 4/2013 | Rentschler et al. | |
| 2013/0151072 A1* | 6/2013 | Jeong | B62D 1/046 701/36 |
| 2014/0139341 A1 | 5/2014 | Green et al. | |
| 2014/0328077 A1 | 11/2014 | Tovar et al. | |

OTHER PUBLICATIONS

Written Opinion for Corresponding PCT/FR2017/050973 dated Aug. 30, 2017.

\* cited by examiner

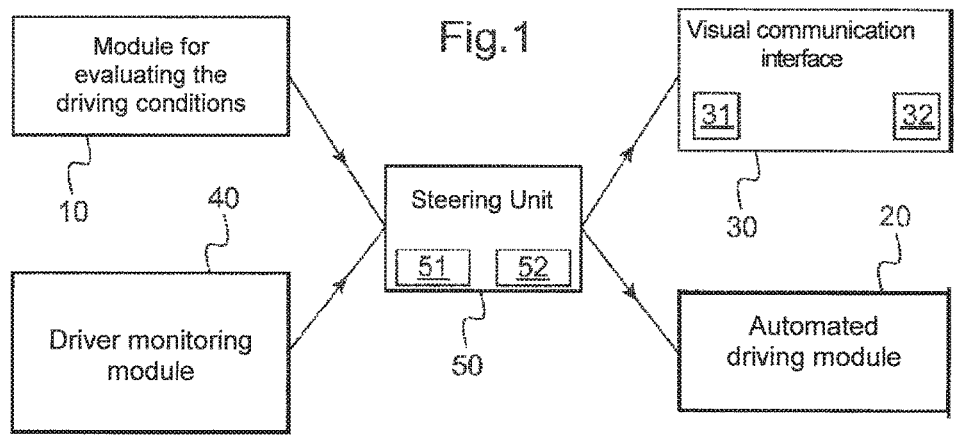
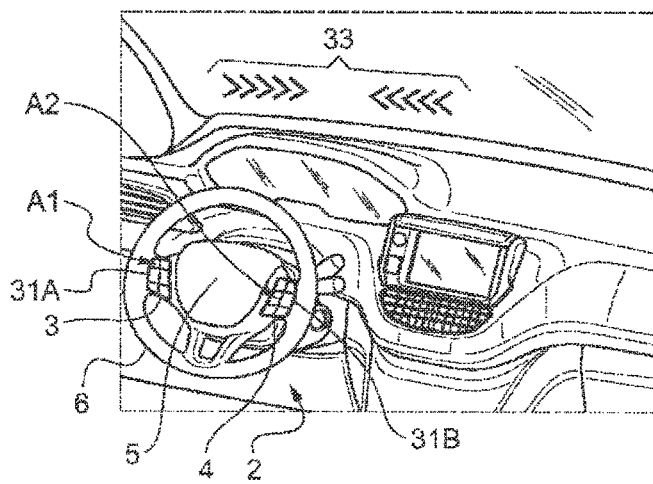
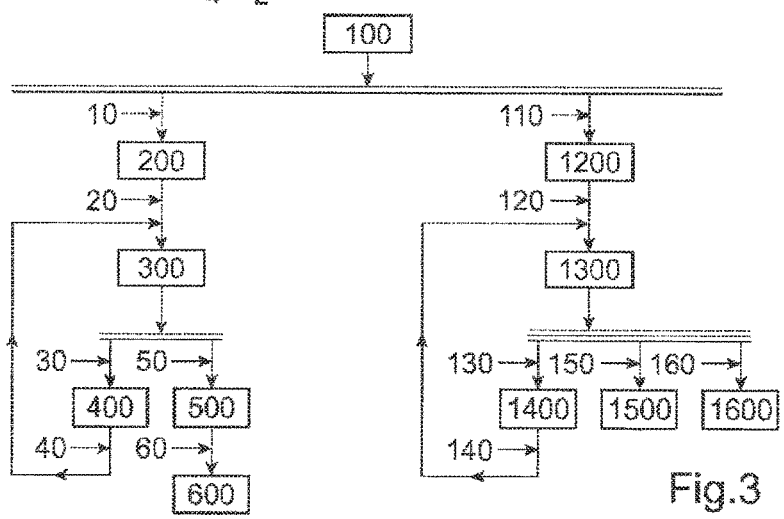

AUTOMATED DRIVING SYSTEM FOR A MOTOR VEHICLE PROVIDED WITH AN ADVANCED VISUAL COMMUNICATION INTERFACE

CROSS-REFERENCE TO RELATED APPLICATIONS

This application is the US National Stage under 37 CFR § 371 of PCT/FR2017/050973 filed Apr. 24, 2017 which claims priority to French App. No. 1653627 filed Apr. 25, 2016, both of which are incorporated herein by reference.

FIELD OF THE INVENTION

The present invention generally relates to the automated driving systems of a motor vehicle.

BACKGROUND OF THE INVENTION

Systems that provide assistance in driving are now common in the latest motor vehicles and are experiencing rapid development.

Adaptive speed controls (ACC) have been known for some years. Such an assistance mode adjusts the speed automatically so as to maintain a constant safe spacing with the vehicle ahead of the user based on information collected about this vehicle (in particular its distance and speed of approach) using one or more radar, lidar or infra-red sensors.

Dynamic involuntary lane departure warning systems are also known, particularly from US 2013/0096767. These systems, generally known by the acronyms ALKA (for "Active Lane Keep Assist"), LKAS (for "Lane Keep System Assistance), ALA (for "Active Lane Assist") or ALC (for "Active Lane Control"), detect the marking lines on the ground using sensors and/or optical cameras, and act dynamically on the vehicle when the vehicle strays from its lane. The driving assist system will then automatically correct the direction of the vehicle and/or will activate the braking system.

More recently, systems proposing completely automated driving modes have emerged in order to relieve the driver in dense traffic situations on roads with separate carriageways where the speed of the vehicle is reduced.

This is particularly the case for assist modes for driving in congestion (better known under the English acronym TJC for "Traffic Jam Chauffeur") intended to relieve the driver in dense traffic or traffic jam situations (speeds lower than 50/70 km/h) on roads with separate carriageways (motorways and expressways).

One can also mention driving assistance modes on motorways commonly referred to by the acronym HC (for "Highway Chauffeur") that can entirely relieve the driver in fluid traffic situations (at a speed close to the lawful limit) on roads with separate carriageways.

In the event of degradation of the ambient driving conditions requiring a return to the manual driving mode, the TJC or HC types of assistance are able to maintain fully automated guidance of the vehicle for a rather long transition period of ten seconds before returning to the manual mode of control, so that the driver is not required to keep his eyes fixed on the road and can engage in other things (making telephone calls, looking at a film via the information-entertainment system of the vehicle, launching a video game on a computer or a touch pad, reading of book or a magazine, etc.).

Lastly, driving assistance modes on motorways, commonly referred to by the acronyms HAD for ("Highway Automated Driving") or AHDA (for "Automatic Highway Driving Assist"), have lately appeared and they are also able to relieve the driver on roads with separate carriageways but without restrictions on use relating at the speed of the vehicle or the density of the road traffic.

In such a mode, fully automated guidance can only be maintained over a short transition period (typically between 1 and 3 seconds) in the event of degradation of the driving conditions requiring a return to manual control. It is thus essential for the driver to permanently maintain a certain level of attention on the road so as to be ready to instantaneously retake control of the vehicle.

In vehicles equipped with such automated driving systems, it is essential to provide communication interface capable of informing the driver of the state of this system.

U.S. Pat. No. 9,134,729 discloses an automated driving system for motor vehicles comprising a visual communication interface including several light indicators on the steering wheel as well as numerous displays located on the instrument panel capable of emitting light signals of various colors depending on the state of the system.

However, drivers have found such a visual communication interface to be hard to use and it may in turn provoke inappropriate, potentially dangerous reactions.

OBJECT AND SUMMARY OF THE INVENTION

The present invention thus aims to improve the visual communication of such an automated driving system so as to make it possible for the driver to be better informed of the state of the automated driving system.

To accomplish this, an automated motor vehicle driving system is provided which comprises a visual communication interface designed to inform the driver about the state of the driving system and includes an indicator light capable of emitting light signals on the steering wheel of the vehicle, wherein the visual communication interface additionally comprises a heads-up display capable of showing other light signals in the field of vision of the driver beyond the windshield of said vehicle.

The visual communication interface of the driving system makes it possible to display all of the information signals concerning the state of the driving system within the field of vision of the driver, so that his eye can perceive them instantaneously and with increased reliability, as compared to the existing interfaces in which the driver had to systematically shift his glance laterally along the instrument panel so as to find possible complementary signals emitted by other visual indicators.

The automated driving system can include the following preferred characteristics, taken individually or in combination:

The automated driving system proposes two fully automated driving modes with disengagement to the manual driving mode at the end of two transition phases of different durations in the event of non-compatibility of the driving conditions upon their continuation, the information relating to the state of the automated control modes being transmitted by signals only emitted by the indicator light on the steering wheel, while the information relating to the state of the other aforesaid automated control modes is transmitted by signals emitted simultaneously by the indicator light on the steering wheel and the heads-up display;

the heads-up display is capable of transmitting blinking signals of various colors;

the heads-up display comprises a projector with light-emitting diodes capable of projecting a light signal directly onto the windshield of the vehicle so that the signal is directly reflected to the driver, who then sees a virtual image beyond the windshield;

the projector with light-emitting diodes is located behind the dashboard or in the dome light of the vehicle;

the heads-up display comprises a projector for projecting a light signal onto partially transparent reflectors, which reflect the light signal towards the driver, who perceives a virtual image thereof beyond the windshield;

the indicator light on the steering wheel is able to emit fixed or twinkling signals of various colors;

the indicator light on the steering wheel comprises at least one light ring;

the light ring surrounds a zone equipped with control units that make it possible to interact with the system; and/or the indicator light on the steering wheel comprises two light rings installed on two side-branches of the steering wheel connecting its center hub to its peripheral rim.

BRIEF DESCRIPTION OF THE DRAWINGS

The description of the invention will now be continued by means of a detailed description of an exemplary embodiment, provided below on a purely illustrative but nonrestrictive basis with reference to the annexed drawings, of which:

FIG. 1 shows a functional diagram of an automated motor vehicle steering system;

FIG. 2 is a view of the passenger compartment of a motor vehicle equipped with such an automated steering system; and FIG. 3 is a flow chart illustrating a preferred mode of operation of the visual communication interface of the automated steering system.

DETAILED DESCRIPTION OF A PREFERRED EMBODIMENT

The automated steering system 1 shown in FIG. 1 proposes two complementary fully automated driving modes of the vehicle wherein the two modes include:

a first mode of the TJC or HC type with disengagement to the manual steering mode in the event of incompatibility of the driving conditions upon its continuation, at the end of a first transition phase known as "long" transition period, the duration of which is, for example, greater than or equal to 10 seconds; and a second mode of the HAD type with disengagement to the manual driving mode in the event of incompatibility of the driving conditions upon its continuation, at the end of a second transition phase known as "short" transition period, the duration of which is shorter than that of the first transition period which is, for example, shorter than or equal to 3 seconds.

Referring to FIG. 1, this automated driving system 1 comprises a module 10 for evaluating the driving conditions, an automated driving module 20, a visual communication interface 30, a driver monitoring module 40, as well as a control unit 50.

The module 10 for evaluating the driving conditions comprises video acquisition means (for example a camera of the CCD type directed towards the front of the vehicle) delivering images that make it possible to determine the kind of route taken (motorway, expressway or secondary road) based on certain characteristic parameters, such as the width of the road, the road markings (color, width and spacing of the lines) and the possible presence of a barrier or a center island between the two traffic directions. The analysis of the images provided by these video acquisition means moreover makes it possible to establish the level of flow of the road traffic.

The module 10 also includes numerous sensors that measure certain internal driving parameters, such as the instantaneous speed of the vehicle and the steering angle of the steering wheel.

This module 10 moreover comprises a rain detector equipped with an integrated optical or capacitive sensor, for example in the upper part of the windshield, as well as a map system providing a certain amount of information about the upcoming road sections encountered by the vehicle (kind of highway, numbers of routes, degree to which the road winds, the speed limit, etc.).

The driving environment data collected by the evaluation module 10 are conveyed in real time to the automated driving module 20.

The driving module 20 comprises numerous actuators capable of controlling the direction, acceleration, the braking and the gear selector to ensure the implementation of the two entirely automated driving modes which the system 1 proposes.

The visual communication interface 30 comprises an indicator light 31 capable of emitting light signals of a fixed or blinking kind on the steering wheel 2 of the vehicle in various colors (for example, blue, orange and red).

This indicator light on the steering wheel 31 comprises in this case two light rings 31A, 31B located on the two side branches 3, 4 which connect the central hub 5 of the steering wheel 2 to the steering wheel's circular peripheral rim 6, and which encompass two zones A1, A2 equipped with control units that make it possible to interact with the automated driving system 1 (FIG. 2).

The indicator light on the steering wheel alternatively includes a light bar including numerous aligned multicolored light-emitting diodes (LEDs), which are positioned on the upper part of the circular rim of the steering wheel while being integrated in the cladding of the rim.

The communication interface 30 also comprises a heads-up display 32 capable of displaying light signals 33 of various colors (for example, blue, orange and red) of a fixed, flickering and/or flashing kind into the field of vision of the driver beyond the windshield of the vehicle.

In this particular case, these light signals comprise light patterns 33 formed by two sets of several chevrons in mirror position with respect to one another.

The heads-up display 32 comprises a projector advantageously including numerous multicolored high luminosity light-emitting diodes (LEDs) capable of projecting a light signal directly onto the windshield, which reflects the light signal towards the driver, who then perceives a virtual image of the light signal in his field of vision beyond the windshield.

This projector with LEDs is preferably located behind the dashboard or the dome light of the vehicle so that it is out of the view of the driver.

The heads-up display is alternatively of a different kind, with the projector not projecting a light signal directly onto the windshield, but towards partially transparent reflectors, which reflect the light toward the driver so that the driver perceives a virtual image thereof in his field of vision beyond the windshield. In this particular case, the display can also comprise one or more intermediate folding mirrors making it possible to compact the display by folding the optical path.

So that the driver can perceive it more easily, the information concerning the state of one of the two modes of automated control is advantageously transmitted by signals only emitted by the indicator light on the steering wheel, while the information concerning the state of the other automated controls is transmitted by signals emitted simultaneously by the indicator light on the steering wheel and the heads-up display.

These light signals can moreover possibly, in certain circumstances, be associated with aural signals emitted by the loudspeakers of the information-entertainment system and/or by means of an independent alarm system.

The driver monitoring module 40 includes a device for detecting the presence of the driver's hands on the steering wheel equipped with a capacitive layer between the inner foam stuffing and the outer covering jacket made of fabric or leather.

The perturbation of the electric field caused by the presence of the hands on the wheel leads to a change of the capacitive layer.

This detection can also be achieved by other means, in particular by way of pressure sensors located inside the steering wheel that are capable of measuring the local changes of pressure that occur when the driver puts his hands on the steering wheel or takes them away.

The control unit 50 comprises a computer 51 and a storage module 52 including a nonvolatile memory of the EEPROM or FLASH type and a read-write memory.

The nonvolatile memory stores a process for controlling the operation of the visual communication interface 50.

A preferred mode of operation of this visual communication interface 30 starting with an initial state in which the vehicle is in a manual control period (initial stage 100) will now be described with the help of the flow chart of FIG. 3.

When the module for evaluating the driving conditions 10 detects that the driving conditions are compatible with the activation of the first automated control mode of the TJC or HC type with a "long" transition period (event 10), the indicator light 31 on the steering wheel emits a flickering light signal having a first predetermined color (for example, blue) while the heads-up display 32 displays a colored light signal that also flickers in the field of vision of the driver so as to inform the driver that the first automated control mode is available (step 200).

These two signals are moreover emitted at a first predetermined frequency advantageously equal to 1 Hz.

These two signals last until the driving conditions are sufficiently degraded to no longer allow its activation or until the driver activates this first automated driving mode by, for example, pressing one of the control elements located in the two zones A1, A2 of the steering wheel. One can alternatively provide that the emission of these signals ceases at the end of a predetermined time, for example 3 seconds, in order not to distract the driver for too long of a time.

As soon as this first automated driving mode is activated (event 20), the signals emitted by the indicator light 31 on the steering wheel and by the heads-up display 32 remain in the same first predetermined color (for example blue) as during the step 200, but they become fixed so as to inform the driver that control of the vehicle is ensured in an entirely automated way by the first driving mode having a "long" transition period and that the driver can remove his hands from the steering wheel and his feet from the pedals and relax by, for example, looking at a film or while browsing the internet (step 300).

During this automated driving phase, the indicator light on the steering wheel 31 and the heads-up display 32 will periodically emit signals (event 30) for a first predetermined time period of advantageously 20 and 30 minutes, or respectively a flashing light signal of the same first predetermined color (for example, blue), but at a second predetermined frequency that is lower than the first (for example equal to 0.5 Hz), and a signal of the chase type of the same first predetermined color (for example, blue), so as to inform the driver that he should perform a predetermined action designed to make sure that he maintains a minimal level of attention (step 400).

This action can for example consist of the driver putting at least one of his hands on the steering wheel or pressing on one of the control units located in the two zones A1, A2 of the steering wheel.

The process returns to step 300 as soon as the driver has performed the required action (event 40).

When the module for evaluating the driving conditions 10 detects a degradation of the ambient driving conditions hindering the continuation of this first automated driving mode beyond its "long" transition period (event 50), the light indicator on the steering wheel 31 and the heads-up display 32 will emit twinkling light signals of a predetermined second color (for example, orange) at a third predetermined frequency (preferably identical to the first frequency, for example 1 Hz) during an informative period extending over a predetermined shorter duration than this "long" transition period (preferably longer than half of the latter and/or between 6 and 8 s), so as to inform the driver that he must prepare to retake control of the vehicle (step 500).

At the end of this informative period (event 60), the indicator light on the steering wheel 31 and the heads-up display 32 will emit twinkling light signals of a third predetermined color (for example, red) during an alarm period extending to the duration of the "long" transition period at a fourth predetermined frequency (preferably higher than the first predetermined frequency and for example equal to 2 Hz), so as to inform the driver that he must again take control of the vehicle (step 600).

Let us now return to the initial step 100 where the vehicle is in a manual control period.

When the module for evaluating the driving conditions 10 detects that the driving conditions are compatible with the activation of the second automated driving mode of the HAD type having a "short" transition period, but not the first mode of the TJC or HC type having a "long" transition period (event 110), only the indicator light 31 on the steering wheel emits a light signal of the first predetermined color (for example, blue) and at the first predetermined advantageous frequency equal to 1 Hz, so as to inform the driver that this second automated control mode is available (step 1200).

This signal lasts until the driving environment has degraded sufficiently to no longer allow the second driving mode to be activated or until the driver activates this second automated driving mode by, for example, pressing one of the control units located in the two zones A1, A2 of the steering wheel. One can also alternatively arrange that the emission of this signal ceases at the end of a predetermined time, for example 3 seconds, so as not to disturb the driver for too long of a time.

As soon as this second automated driving mode is activated (event 120), the signal emitted by the indicator light on the steering wheel 31 continues to emit the same first predetermined color (for example blue) as during step 1200, but it becomes fixed, so as to inform the driver that the fully automated operation of the vehicle is ensured via the second driving mode using the "short" transition period and that the driver can take his hands off the steering wheel and his feet off the pedals while nevertheless keeping his eye on the road (step 1300).

During this automated driving period, the indicator light on the steering wheel 31 will periodically emit (event 130) a flashing light signal of the same first predetermined color (for example, blue), but at the second predetermined frequency (for example equal to 0.5 Hz), for a second predetermined period (preferably shorter than the first period and advantageously between 10 and 15 minutes) so as to inform the driver that he must perform a predetermined action that allows him to make sure that he maintains an adequate level of attention (step 1400).

This action can, for example, comprise the driver putting at least one of his hands on the steering wheel or pressing on one of the control units located in the two zones A1, A2 of the steering wheel.

As soon as the driver has performed the required action (event 140), the process returns to step 1300.

If the module for evaluating the driving conditions 10 detects a degradation of the ambient driving conditions preventing the continuation of this second automated driving mode beyond its "short" transition period (event 150), the indicator light 31 on the steering wheel will periodically emit a blinking light signal of the third second predetermined color (for example red) and at a fourth predetermined frequency (for example 2 Hz) for an alert period extending to the duration of the "short" transition period, so as to inform the driver that he must take control of the vehicle (step 1500).

One can also alternatively provide for the heads-up display 32 to also emit a blinking light signal of the third second predetermined color (for example, red) and at the fourth predetermined frequency (for example 2 Hz) during this alarm period, so that the driver will react more quickly, but at the expense of the computer logic of this automated driving mode preferably associated with the emission of signals by the only indicator light on the steering wheel 31.

Conversely, if the module 10 evaluating the driving conditions detects an improvement of the ambient driving conditions allowing for the activation of the first automated driving mode with the "long" transition period (event 160) while the second automated driving mode is activated, the indicator light 31 on the steering wheel continues to emit the fixed signal of the first predetermined color (for example, blue), while the heads-up display 32 shows a blinking light signal of the same color as that emitted by the heads-up display in the field of vision of the driver (step 1600).

It should be generally remembered that the present invention is not limited to the embodiments described and shown, but rather that it encompasses all execution variants accessible to those skilled in the art.

The invention claimed is:

1. An automated driving system for a motor vehicle comprising a visual communication interface for informing a driver of the motor vehicle of a status of said automated driving system; said automated driving system including an indicator light capable of emitting first light signals on a steering wheel of said motor vehicle and a heads-up display capable of displaying second light signals in a field of vision of the driver beyond a windshield of said motor vehicle, wherein, the automated driving system comprises two fully automated driving modes, with disengagement of the automated driving system to a manual driving mode occurring at an end of two transition periods of different durations if the automated driving modes are discontinued in an event of incompatibility of a driving environment, wherein information relating to a state of one of said automated driving modes is transmitted by signals only emitted by said indicator light on the steering wheel, and information relating to a state of the other of said automated driving modes is transmitted by signals simultaneously emitted by said indicator light on the steering wheel and said heads-up display.

2. The automated driving system according to claim 1, wherein said heads-up display is able to transmit fixed, twinkling or blinking signals of various colors.

3. The automated driving system according to claim 1, wherein said heads-up display comprises a projector with light-emitting diodes capable; said projector projecting said second light signals directly onto said windshield, so that the second light signals are reflected towards said driver who perceives a virtual image of the second light signal beyond said windshield.

4. The automated driving system according to claim 3, wherein said projector with light-emitting diodes is located behind a dashboard or in a dome light of said motor vehicle.

5. The automated driving system according to claim 1, wherein said heads-up display comprises a projector capable of projecting said second light signals onto a partially transparent reflector which reflects the second light signals towards the driver who perceives a virtual image thereof beyond of said windshield.

6. The automated driving system according to claim 1, wherein said indicator light on the steering wheel is capable of emitting fixed or blinking signals of various colors.

7. The automated driving system according to claim 1, wherein said indicator light on the steering wheel comprises at least one light ring.

8. The automated driving system according to claim 7, wherein said light ring encloses a zone equipped with control members enabling interaction by the driver with said automated driving system.

9. The automated driving system according to claim 7, wherein said indicator light on the steering wheel comprises two light rings installed in side branches of said steering wheel which connect a central hub of said steering wheel to a peripheral rim of said steering wheel.

* * * * *